US 11,731,143 B2

(12) United States Patent
Rothman et al.

(10) Patent No.: US 11,731,143 B2
(45) Date of Patent: Aug. 22, 2023

(54) MINERAL SEPARATION USING FUNCTIONALIZED MEMBRANES

(75) Inventors: Paul J. Rothman, Windsor, CT (US); Mark R. Fernald, Enfield, CT (US); Francis K. Didden, Wallingford, CT (US); Christian V. O'Keefe, Durham, CT (US); Douglas H. Adamson, Mansfield Center, CT (US)

(73) Assignee: CiDRA CORPORATE SERVICES INC., Wallingford, CT (US)

( * ) Notice: Subject to any disclaimer, the term of this patent is extended or adjusted under 35 U.S.C. 154(b) by 362 days.

(21) Appl. No.: 14/117,209

(22) PCT Filed: May 25, 2012

(86) PCT No.: PCT/US2012/039534
§ 371 (c)(1),
(2), (4) Date: Feb. 7, 2014

(87) PCT Pub. No.: WO2012/162591
PCT Pub. Date: Nov. 29, 2012

(65) Prior Publication Data
US 2014/0138324 A1     May 22, 2014

Related U.S. Application Data

(60) Provisional application No. 61/533,544, filed on Sep. 12, 2011, provisional application No. 61/489,893, filed on May 25, 2011.

(51) Int. Cl.
*B01D 37/02* (2006.01)
*C02F 1/24* (2023.01)
(Continued)

(52) U.S. Cl.
CPC ............... *B03C 5/00* (2013.01); *B01D 15/02* (2013.01); *B01D 37/02* (2013.01); *B01D 39/00* (2013.01);
(Continued)

(58) Field of Classification Search
CPC ........ B01D 37/02; B01D 15/02; B01D 39/00; B01D 37/00; B01D 15/00;
(Continued)

(56) References Cited

U.S. PATENT DOCUMENTS

| 1,684,536 A | 9/1928 | Fischer |
| 2,585,473 A | 2/1952 | Kennedy |

(Continued)

FOREIGN PATENT DOCUMENTS

| CN | 101778957 | 7/2010 |
| CN | 101970119 | 2/2011 |

(Continued)

OTHER PUBLICATIONS

Nimittrakoolchai et al., Deposition of transparent, hydrophobic polydimethylsiloxane—nanocrystalline TiO2 hybrid films on glass substrate, Sep. 28, 2007, Songklanakarin, pp. 1, 2, and 6.*

(Continued)

*Primary Examiner* — Bobby Ramdhanie
*Assistant Examiner* — Donovan Bui-Huynh
(74) *Attorney, Agent, or Firm* — Ware, Fressola, Maguire & Barber LLP

(57) ABSTRACT

A machine or apparatus featuring a first processor and a second processor. The first processor is configured to receive a mixture of fluid, valuable material and unwanted material and a functionalized polymer coated member configured to attach to the valuable material in an attachment rich environment, and provide an enriched functionalized polymer coated member having the valuable material attached (Continued)

thereto. The second processor is configured to receive a fluid and the enriched functionalized polymer coated member in a release rich environment to release the valuable material, and provide the valuable material released from the enriched functionalized polymer coated member.

36 Claims, 6 Drawing Sheets

(51) Int. Cl.
| | |
|---|---|
| B01D 39/00 | (2006.01) |
| B01D 15/02 | (2006.01) |
| B03C 5/00 | (2006.01) |
| B04C 1/00 | (2006.01) |
| B07B 1/00 | (2006.01) |
| B03B 1/04 | (2006.01) |
| B03C 1/01 | (2006.01) |
| B03D 1/02 | (2006.01) |
| B03D 1/14 | (2006.01) |
| C22B 15/00 | (2006.01) |
| B03D 1/016 | (2006.01) |
| B03C 5/02 | (2006.01) |

(52) U.S. Cl.
CPC ............ *B03B 1/04* (2013.01); *B03C 1/01* (2013.01); *B03C 5/02* (2013.01); *B03D 1/016* (2013.01); *B03D 1/023* (2013.01); *B03D 1/14* (2013.01); *B04C 1/00* (2013.01); *B07B 1/00* (2013.01); *C02F 1/24* (2013.01); *C22B 15/0063* (2013.01); *Y10T 428/2982* (2015.01)

(58) Field of Classification Search
CPC ........ B01D 2215/022; B01D 2201/188; B01D 2215/021; B01D 29/014; B01D 29/56; B01D 36/02; B01D 36/04; B03C 5/00; B03C 5/02; B03C 1/01; B03C 1/00; B03C 1/30; B03C 2201/20; B03B 1/04; B03D 1/016; B03D 1/023; B03D 1/14; B03D 1/10; C02F 1/24; C02F 1/001; C02F 1/004; C02F 1/32; C02F 1/40; C02F 1/44; C02F 1/444; C02F 2101/20; C02F 2103/001; C02F 2103/002; C02F 2103/007; C02F 2103/325; C02F 2103/38; C02F 2103/44; C02F 2201/008; C02F 3/082; C02F 3/10; B04C 1/00; B07B 1/00; C22B 1/00; C22B 15/0002; C22B 15/0008; C22B 15/0063; C08G 18/12; C08G 18/3206; C08G 18/3234; C08G 18/3893; C08G 18/44; C08G 18/4854; C08G 18/4858; C08G 18/61; C08G 18/7671; C08G 18/831; C08G 18/837; C08G 2270/00; C08G 77/045; C08G 77/38; C08G 77/80; C08K 5/544; C08K 9/06; C08L 83/14; C08L 2205/04; C08L 33/02; C08L 75/04; C08L 75/06; C08L 75/16; C08L 83/04; A61F 2002/30998; A61F 2002/4205; A61F 2002/4238; A61F 2002/4256; A61F 2310/00011; A61F 2310/00179; A61F 2/30; A61F 2/30988; A61F 2/3099; A61F 2/32; A61F 2/3804; A61F 2/3859; A61F 2/3872; A61F 2/3877; A61F 2/4081; A61F 2/4202; A61F 2/4225; A61F 2/4241; A61F 2/4261; A61F 2/442; B01J 19/22; B01J 20/26; B01J 20/265; B01J 20/28004; B01J 20/28023; B01J 20/28033; B01J 20/28038; B01J 20/285; B01J 20/286; B01J 20/328; B01J 47/12; C08F 220/06; C08F 220/14; C08F 236/06; C09D 183/04; C12M 27/02; Y02W 10/10; Y02W 10/15; Y02W 10/37; C03C 17/30; Y10T 428/2982; Y10T 428/31612; Y10T 428/31663
See application file for complete search history.

(56) References Cited

U.S. PATENT DOCUMENTS

| | | |
|---|---|---|
| 2,588,976 A | 3/1952 | Fuhrmeister, Jr. |
| 2,678,132 A * | 5/1954 | Beard, Jr. ............ B01D 15/02 127/55 |
| 2,699,872 A | 1/1955 | Kelsey |
| 2,934,208 A | 4/1960 | Schoeld et al. |
| 3,224,582 A | 12/1965 | Iannicelli |
| 3,796,308 A | 3/1974 | McIlhinney et al. |
| 3,868,318 A | 2/1975 | Clark et al. |
| 3,970,518 A | 7/1976 | Giaever |
| 4,100,242 A | 7/1978 | Leach |
| 4,177,253 A | 12/1979 | Davies et al. |
| RE30,360 E | 8/1980 | Shubert |
| 4,224,138 A | 9/1980 | Kruyer |
| 4,235,562 A | 11/1980 | Ribas |
| 4,236,995 A | 12/1980 | Kruyer |
| 4,269,699 A | 5/1981 | McCready et al. |
| 4,313,832 A | 2/1982 | Shimizu et al. |
| 4,358,368 A | 11/1982 | Hellsten et al. |
| 4,363,749 A | 12/1982 | Weiss et al. |
| 4,391,608 A | 7/1983 | Dondelewski |
| 4,412,843 A | 11/1983 | Burgess et al. |
| 4,511,461 A | 4/1985 | Kruyer |
| 4,532,032 A | 7/1985 | Ng et al. |
| 4,537,599 A | 8/1985 | Greenwald, Sr. |
| 4,556,482 A | 12/1985 | Nagaraj |
| 4,657,666 A | 4/1987 | Snook et al. |
| 4,685,963 A | 8/1987 | Saville |
| 4,888,106 A | 12/1989 | Lipp et al. |
| 4,956,077 A | 9/1990 | Banwise |
| 4,971,685 A | 11/1990 | Stanley et al. |
| 4,981,582 A | 1/1991 | Yoon et al. |
| 5,161,694 A | 11/1992 | Yoon et al. |
| 5,167,798 A | 12/1992 | Yoon et al. |
| 5,192,423 A | 3/1993 | Duczmal et al. |
| 5,256,298 A * | 10/1993 | Powell ............... B01D 15/02 210/263 |
| 5,603,841 A | 2/1997 | Kerr |
| 5,670,056 A | 9/1997 | Yoon et al. |
| 5,965,117 A | 10/1999 | Howard, Jr. et al. |
| 6,234,318 B1 | 5/2001 | Breau et al. |
| 6,312,603 B1 | 11/2001 | Nishizawa |
| 6,319,407 B1 | 11/2001 | Maatta et al. |
| 6,799,682 B1 | 10/2004 | Yoon |
| 6,871,743 B2 | 3/2005 | Yoon |
| 6,890,431 B1 | 5/2005 | Eades et al. |
| 7,264,728 B2 | 9/2007 | Gibson et al. |
| 7,285,219 B2 * | 10/2007 | Kolesinski ............ B01J 20/26 210/198.2 |
| 7,426,852 B1 | 9/2008 | Rothman |
| 7,488,418 B2 * | 2/2009 | Miller ............... B01D 29/014 134/10 |
| 7,641,863 B2 | 1/2010 | Doktycz et al. |
| 7,686,960 B2 | 3/2010 | Cort |
| 7,759,123 B2 | 7/2010 | Call |
| 7,891,213 B2 | 2/2011 | Bogdahn et al. |
| 8,007,754 B2 | 8/2011 | Yoon et al. |
| 8,408,395 B2 | 4/2013 | Domke |
| 9,302,270 B2 | 4/2016 | Rothman |
| 9,566,613 B2 | 2/2017 | Kodama et al. |
| 2001/0008617 A1 | 7/2001 | Robles |
| 2002/0028901 A1 * | 3/2002 | Gunatillake ......... C08G 18/12 528/28 |
| 2003/0104359 A1 | 6/2003 | Cuthbertson et al. |
| 2003/0225231 A1 | 12/2003 | Hall |

(56) References Cited

U.S. PATENT DOCUMENTS

| | | |
|---|---|---|
| 2004/0000523 A1 | 1/2004 | Rosenberg et al. |
| 2004/0173506 A1 | 9/2004 | Doktycz et al. |
| 2005/0009953 A1* | 1/2005 | Shea .............. C08L 83/04 523/169 |
| 2005/0029195 A1 | 2/2005 | Gibson et al. |
| 2005/0029204 A1 | 2/2005 | Schwartzkopf |
| 2005/0051465 A1 | 3/2005 | Khan et al. |
| 2005/0139551 A1 | 6/2005 | Yoon |
| 2005/0155415 A1 | 7/2005 | Kurkowski et al. |
| 2005/0242000 A1 | 11/2005 | Khan et al. |
| 2006/0113259 A1 | 6/2006 | Brunone |
| 2006/0151397 A1 | 7/2006 | Wright et al. |
| 2006/0226051 A1 | 10/2006 | Navarrette et al. |
| 2006/0263516 A1 | 11/2006 | Jones et al. |
| 2006/0283516 A1 | 12/2006 | Nagaoka et al. |
| 2008/0139399 A1 | 6/2008 | Fonnum et al. |
| 2008/0156702 A1 | 7/2008 | Duyvesteyn |
| 2008/0290029 A1 | 11/2008 | Croue et al. |
| 2009/0061226 A1 | 3/2009 | Banin et al. |
| 2009/0139906 A1 | 6/2009 | Kruyer |
| 2009/0173668 A1 | 7/2009 | Duyvesteyn et al. |
| 2009/0206040 A1 | 8/2009 | Berg et al. |
| 2009/0267275 A1 | 10/2009 | Birken |
| 2009/0301972 A1 | 12/2009 | Hines et al. |
| 2010/0059449 A1 | 3/2010 | Grass et al. |
| 2010/0072110 A1 | 3/2010 | Gradek |
| 2010/0108573 A1 | 5/2010 | Ravishankar et al. |
| 2010/0200510 A1* | 8/2010 | Domke .............. B03C 1/01 210/679 |
| 2010/0228056 A1 | 9/2010 | Wang et al. |
| 2010/0279322 A1 | 11/2010 | Tang et al. |
| 2010/0285606 A1 | 11/2010 | Phillips et al. |
| 2010/0294725 A1* | 11/2010 | Bush .............. C02F 1/5272 210/702 |
| 2010/0300941 A1 | 12/2010 | Domke et al. |
| 2011/0114566 A1 | 5/2011 | McCaw et al. |
| 2011/0120919 A1 | 5/2011 | Domke et al. |
| 2011/0120954 A1 | 5/2011 | Domke |
| 2011/0131873 A1 | 6/2011 | Soane et al. |
| 2011/0174696 A1 | 7/2011 | Young |
| 2012/0029120 A1 | 2/2012 | Soane et al. |
| 2012/0076694 A1 | 3/2012 | Morozov et al. |
| 2012/0091000 A1 | 4/2012 | Taylor et al. |
| 2012/0209396 A1* | 8/2012 | Myung .............. C08G 18/4854 623/22.11 |
| 2013/0140218 A1 | 6/2013 | Dobby |

FOREIGN PATENT DOCUMENTS

| | | |
|---|---|---|
| EP | 0164237 | 12/1980 |
| EP | 0163480 A1 | 12/1985 |
| EP | 0348620 | 1/1990 |
| EP | 1184064 | 3/2002 |
| EP | 2313200 | 4/2011 |
| EP | 2714055 A1 | 4/2014 |
| GB | 1339337 | 12/1973 |
| KZ | 22494 | 5/2010 |
| RU | 2038155 | 6/1995 |
| RU | 2063813 | 7/1996 |
| RU | 2091141 | 9/1997 |
| SU | 118472 | 1/1959 |
| SU | 441314 | 8/1974 |
| SU | 1558473 | 4/1990 |
| WO | 8301397 | 4/1983 |
| WO | 8404701 | 12/1984 |
| WO | 8910202 A1 | 11/1989 |
| WO | 9211091 | 7/1992 |
| WO | 02066168 | 8/2002 |
| WO | 2004064997 | 8/2004 |
| WO | 2005066631 | 7/2005 |
| WO | 2007098115 | 8/2007 |
| WO | 2008055371 | 5/2008 |
| WO | 2009030669 | 3/2009 |
| WO | 20090252362 | 4/2009 |
| WO | 2010007157 | 1/2010 |
| WO | 2010098786 A1 | 9/2010 |
| WO | 2011091522 | 8/2011 |
| WO | 2012028701 | 3/2012 |

OTHER PUBLICATIONS

Mukhopadhyay, When PDMS isn't the best, May 1, 2007 (Year: 2007).*

Wyss et al. "A novel approach for the extraction of herbicides and pesicides from water using liquid-core microcapsules" by Wyss et al. Biotechnology and Engineering; Aug. 19, 2004; abstract, 3 pages.

Krishna et al. "Synthesis of xanthate functionalized silica gel and its application for the preconcentration and separation of uranium (VI) from inorganic components." Journal of Radioanalytical and Nuclear Chemistry. vol. 266, No. 2 (2005) 251-257.

Brown et al. Magnetic Control over Liquid Surface Properties with Responsive Surfactants. Angew. Chem. Int. Ed. 51: 1-4, 2012 (retrieved on Apr. 6, 2013). Retrieved from the Internet. <URL: http://www.magneticmicrosphere.com/ckfinder/userfiles/files/Brown_magnetic_detergent_2012.pdf>. entire document.

"The process of separation of fine mineral particles by flotation with hydrophobic polymeric carrier" by Jorge Rubio et al, International Journal of Mineral Processing, vol. 37, No. 1-2, Jan. 1, 1993, pp. 109-122.

CN101778957 English Language Abstract (1 page).

Please see excerpt from p. 2/15 of a 4th Office Action issued by the State Intellectual Property Office dated Jul. 21, 2016 showing relevance of p. 338 of Application of Polymer in Concrete, Aug. 31, 2003.

Application of polymer in concrete, Shiyun Zhong, et al., Chemical industry press, published on Aug. 31, 2003, p. 338.

Decision on Granting issued by the Russian Patent Office in counterpart Russian application 2013157534 dated Feb. 24, 2016 (8 pages).

EP056240 unavailable, so published as WO 9211091, cited herein.

EP2714055 unavailable, also published as WO2012162753A1, cited herein.

English Language Abstract of EP2313200 not available EP2313200 also published as WO2010007157A1—Abstract of which is attached here.

RU2091141 English Language Abstract (1 page).

SU441314 English Language translation (4 pages).

KZ22494 English Language Abstract (1 page). There are two Patentees of KZ22494—«(73) Товарищество с bграниченной Институт высоких технологий ответственностью "Горнорудная компания"; Товарищество с ограниченной ответственностью ». The Patentees are translated as: (73) limited liability company «Ore mining company»; limited liability company «Institute of high technology».

English Language Abstract of CN101970119 (1 page).

English language Abstract of SU 118472 (2 pages).

English Language Abstract of RU2063813.

English Language Abstract of RU2038155.

English Language Abstract of SU 1558473.

European Office Action in Application No. 12 790 002.5 dated Jul. 7, 2020 (5 pages).

* cited by examiner

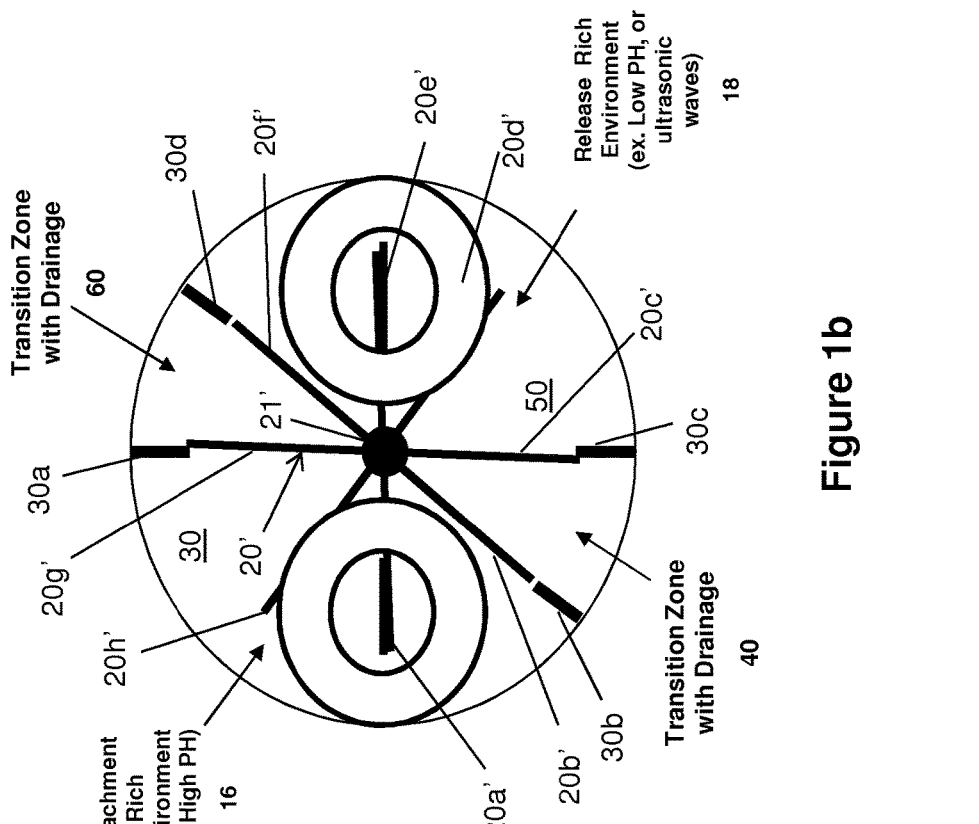
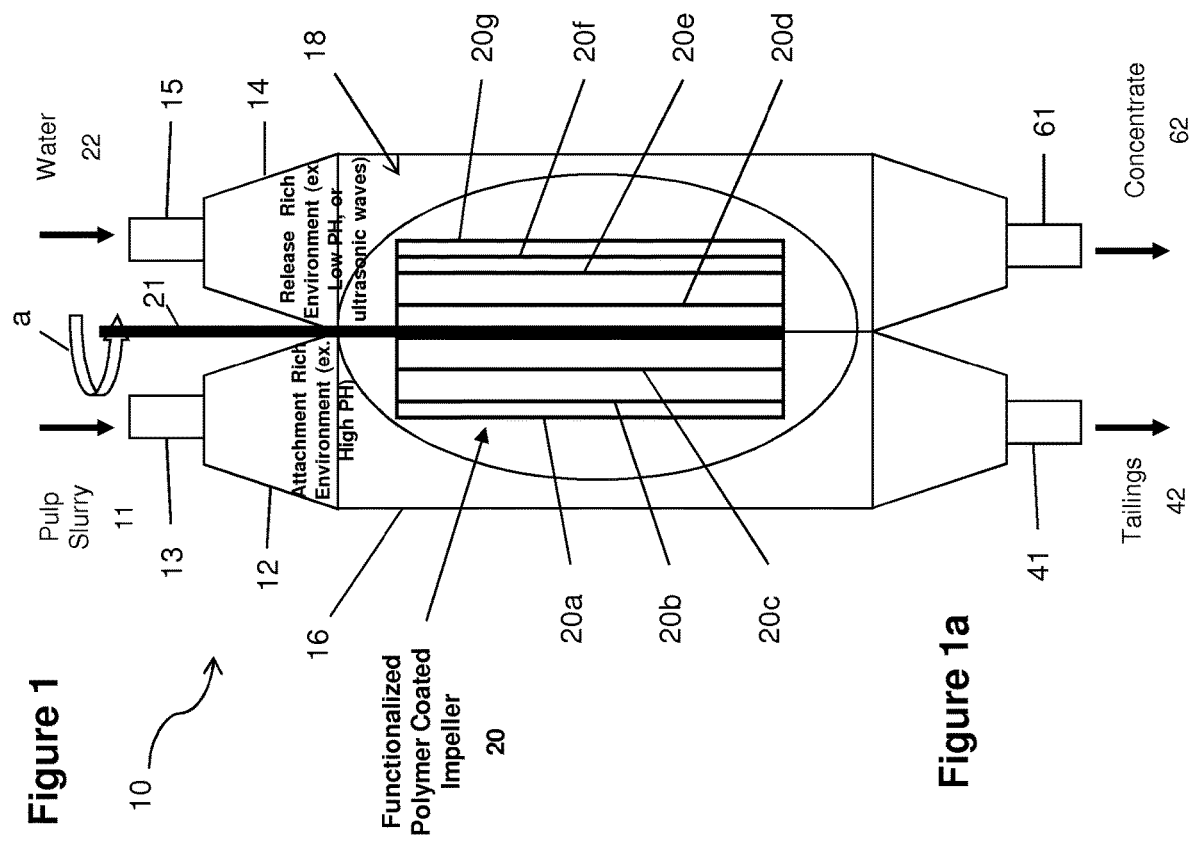

MINERAL SEPARATION USING FUNCTIONALIZED MEMBRANES

CROSS-REFERENCE TO RELATED APPLICATIONS

The present application corresponds to international patent application serial no. PCT/US2012/039534, filed 25 May 2012, which claims the benefit of U.S. Provisional Patent Application No. 61/489,893, filed 25 May 2011, and U.S. Provisional Patent Application No. 61/533,544, filed 12 Sep. 2011, which are both incorporated by reference in their entirety.

This application is also related to the following eight PCT applications, which are all concurrently filed on 25 May 2012, which all claim the benefit of the aforementioned U.S. Provisional Patent Application No. 61/489,893, filed 25 May 2011, and the aforementioned U.S. Provisional Patent Application No. 61/533,544, filed 12 Sep. 2011, and which are all incorporated by reference in their entirety so as to include the subject matter of each other, as follows:

PCT application no. PCT/US12/39528, entitled "Flotation separation using lightweight synthetic bubbles and beads;"

PCT application no. PCT/US12/39540, entitled "Mineral separation using sized, weighted and magnetized beads;"

PCT application no. PCT/US12/39576, entitled "Synthetic bubbles/beads functionalized with molecules for attracting or attaching to mineral particles of interest;"

PCT application no. PCT/US12/39591, entitled "Method and system for releasing mineral from synthetic bubbles and beads;"

PCT application no. PCT/US/39596, entitled "Synthetic bubbles and beads having hydrophobic surface;"

PCT application no. PCT/US/39631, entitled "Mineral separation using functionalized filters and membranes;"

PCT application no. PCT/US12/39655, entitled "Mineral recovery in tailings using functionalized polymers;" and PCT application no. PCT/US12/39658, entitled "Techniques for transporting synthetic beads or bubbles In a flotation cell or column."

BACKGROUND OF THE INVENTION

1. Technical Field

This invention relates generally to a method and apparatus for separating valuable material from unwanted material in a mixture, such as a pulp slurry.

2. Description of Related Art

In many industrial processes, flotation is used to separate valuable or desired material from unwanted material. By way of example, in this process a mixture of water, valuable material, unwanted material, chemicals and air is placed into a flotation cell. The chemicals are used to make the desired material hydrophobic, as well as to aid the formation of bubbles and the stability of the froth, and the air is used to carry the material to the surface of the flotation cell. When the hydrophobic material and the air bubbles collide they become attached to each other. The bubble rises to the surface carrying the desired material with it.

The performance of the flotation cell is dependent on the bubble surface area flux in the collection zone of the cell. The bubble surface area flux is dependent on the size of the bubbles and the air injection rate. Controlling the bubble surface area flux has traditionally been very difficult. This is a multivariable control problem and there are no dependable real time feedback mechanisms to use for control.

There is a need in the industry to provide a better way to separate valuable material from unwanted material, e.g., including in such a flotation cell, so as to eliminate problems associated with using air bubbles in such a separation process.

SUMMARY OF THE INVENTION

The present invention provides mineral separation techniques using functionalized membranes.

The present invention consists of a new machine and process for recovering valuable materials or minerals from mineral rich pulp slurry. This slurry could be any type of slurry being air conveyed ground minerals or an aqueous mixture for example. This mineral rich slurry may be put into contact with a functionalized polymer surface which has been engineered to attract or attach to the mineral of interest. The functionalized polymer surface may take the form of a synthetic bubble or bead, consistent with that set forth in the aforementioned PCT application no. PCT/US2012/039534, both filed 25 May 2012, claiming benefit to the aforementioned U.S. Provisional Patent Application No. 61/489,893, as well as a membrane or membrane structure that may take the form of an impeller, a conveyor belt, a filter assembly, or a flat plate, consistent with that set forth in the aforementioned U.S. Provisional Patent Application No. 61/533,544.

The unwanted material may be washed away and only the desirable material or mineral is left on the functionalized polymer surface, or the membrane structure containing the functionalized polymer surface may be separated from the unwanted material. Such separation can take place via techniques related to flotation, size separation, gravimetric separation, and/or magnetic separation. The enriched surface is then treated so that the mineral is released and collected. The polymer surface can then be reused.

According to some embodiments of the present invention, the machine or apparatus will be configured with two chambers, tanks, cells or columns. One chamber, tank, cell or column has an environment conducive to attachment of a valuable material or mineral or particle of interest and the other chamber, tank, cell or column has an environment conducive for release of the valuable material or mineral or particle of interest. An impeller may be coated with a functionalized polymer and configured to rotate slowly inside the two chambers, tanks, cells or columns. As an impeller blade moves into an attachment zone in the one chamber, tank, cell or column, it collects the valuable material or mineral or particle of interest. As the enriched blade moves to a release zone in the other chamber, tank, cell or column, the valuable material or mineral or particle of interest are released.

According to some embodiments of the present invention, a functionalized polymer conveyor belt may be configured to run between the two chambers, tanks, cells or columns, whereby it collects and releases the valuable material or mineral or particle of interest.

According to some embodiments of the present invention, a functionalized polymer collection filter may be placed into each chamber, tank, cell or column to collect and release the valuable material or mineral or particle of interest. This is a batch type process.

Embodiment of Mineral Separation Apparatus

In its broadest sense, the present invention may take the form of a machine, system or apparatus featuring a first processor and a second processor. The first processor may be configured to receive a mixture of fluid, valuable material and unwanted material and a functionalized polymer coated member configured to attach to the valuable material in an attachment rich environment, and provide an enriched functionalized polymer coated member having the valuable material attached thereto. The second processor may be configured to receive a fluid and the enriched functionalized polymer coated member in a release rich environment to release the valuable material, and provide the valuable material released from the enriched functionalized polymer coated member to the release rich environment.

The apparatus may be configured to include one or more of the following features:

The first processor may take the form of a first chamber, tank, cell or column, and the second processor may take the form of a second chamber, tank, cell or column.

The first chamber, tank or column may be configured to receive a pulp slurry having water, the valuable material and the unwanted material in the attachment rich environment, which has a high pH, conducive to attachment of the valuable material.

The second chamber, tank or column may be configured to receive water in the release rich environment, which may have a low pH or receive ultrasonic waves conducive to release of the valuable material.

Although the invention is described as having a high pH in an attachment environment and a low pH in a release environment, the present invention will work equally as well where the pH of the attachment environment is selected to optimize the attachment of desired materials, such as a low, high or neutral pH, and the pH of the release environment is selected to be a different pH than the attachment environment and selected to optimize the release of the desired material.

The functionalized polymer coated member may take the form of a functionalized polymer coated impeller having at least one impeller blade configured to rotate slowly inside the first processor and the second processor. The first processor may be configured to receive the at least one impeller blade in an attachment zone, and provide at least one enriched impeller blade having the valuable material attached thereto in the attachment zone. The second processor may be configured to receive the at least one enriched impeller blade in a release zone and to provide the valuable material released from the at least one enriched impeller blade. The first processor may be configured with a first transition zone to provide drainage of tailings, and the second processor may be configured with a second transition zone to provide drainage of concentrate.

As used herein with respect to functionalized polymer, the term "enriched" is intended to refer to a functionalized material that has been exposed to a material of interest, and wherein the material of interest has been attached, attracted, connected or otherwise collected by the functionalized material prior to release.

The functionalized polymer coated member may take the form of a functionalized polymer coated conveyor belt configured to run between the first processor and the second processor. The first processor may be configured to receive the functionalized polymer coated conveyor belt and provide an enriched functionalized polymer coated conveyor belt having the valuable material attached thereto. The second processor may be configured to receive the enriched functionalized polymer coated conveyor belt and provide the valuable material released from the enriched functionalized polymer coated conveyor belt. The functionalized polymer coated conveyor belt may be made of a mesh material.

The functionalized polymer coated member may take the form of a functionalized polymer coated collection filter configured to move between the first processor and the second processor as part of a batch type process. The first processor may be configured to receive the functionalized polymer coated collection filter and to provide an enriched functionalized polymer coated collection filter having the valuable material attached thereto. The second processor device may be configured to receive the enriched functionalized polymer coated collection filter and provide the valuable material released from the enriched functionalized polymer coated collection filter.

The first processor may be configured to provide tailings containing the unwanted material, and the second processor may be configured to provide a concentrate containing the valuable material.

The functionalized polymer coated member may take the form of a membrane or a thin soft pliable sheet or layer.

According to some embodiment, the present invention may also take the form of apparatus featuring first means that may be configured to receive a mixture of fluid, valuable material and unwanted material and a functionalized polymer coated member configured to attach to the valuable material in an attachment rich environment, and provide an enriched functionalized polymer coated member having the valuable material attached thereto; and second means that may be configured to receive a fluid and the enriched functionalized polymer coated member in a release rich environment to release the valuable material, and provide the valuable material released from the enriched functionalized polymer coated member to the release rich environment.

According to some embodiments of the present invention, the first means may be configured to receive a pulp slurry having water, the valuable material and the unwanted material in the attachment rich environment, which has a high pH, conducive to attachment of the valuable material; and the second means may be configured to receive water in the release rich environment, which has a low pH or receives ultrasonic waves conducive to release of the valuable material.

According to some embodiments of the present invention, the functionalized polymer coated member may take the form of one of the following:

a functionalized polymer coated impeller having at least one impeller blade configured to rotate slowly inside the first means and the second means;

a functionalized polymer coated conveyor belt configured to run between the first means and the second means; or a functionalized polymer coated collection filter configured to move between the first means and the second means as part of a batch type process.

Embodiments of Mineral Separation Processes or Methods

According to some embodiment, the present invention may also take the form of a process or method featuring receiving in a first processor a mixture of fluid, valuable material and unwanted material and a functionalized polymer coated member configured to attach to the valuable material in an attachment rich environment, and providing from the first processor an enriched functionalized polymer coated member having the valuable material attached thereto; and receiving in a second processor a fluid and the enriched functionalized polymer coated member in a release rich environment to release the valuable material, and providing the valuable material released from the enriched functionalized polymer coated member to the release rich environment.

According to some embodiments of the present invention, the method may include being implemented consistent with one or more of the features set forth herein.

The Synthetic Functionalized Polymer Coated Member Chemistry

According to some embodiments of the present invention, the functionalized polymer coated member may take the form of a solid-phase body comprising a surface in combination with a plurality of molecules attached to the surface, the molecules comprising a functional group selected for attracting or attaching to one or more mineral particles of interest to the molecules. The term "polymer" in this specification is understood to mean a large molecule made of many units of the same or similar structure linked together.

According to some embodiments of the present invention, the solid-phase body may be made of a synthetic material comprising the molecules. By way of example, the synthetic material may be selected from a group consisting of, but not limited to, polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin and polydimethylsiloxane.

According to some embodiments of the present invention, the solid-phase body may include an inner material and a shell providing the surface, the shell being made of a synthetic material comprising the molecules.

According to some embodiments of the present invention, the functional group may have an ionic group, which may be either anionic or cationic, for attracting or attaching the mineral particles to the surface.

According to some embodiments of the present invention, the functional group may take the form of a collector having a non-ionizing bond having a neutral or ionic functional group, or having an ionizing bond.

According to some embodiments of the present invention, the ionizing bond may be an anionic bond or a cationic bond. The anionic functional group may be comprised of an oxyhydryl, including carboxylic, sulfates and sulfonates, and sulfhydral bond.

Hydrophobicity

According to some embodiments of the present invention, the surface of the polymer coated member may be functionalized to be hydrophobic so as to provide a bonding between the surface and a mineral particle associated with one or more hydrophobic molecules.

Furthermore, the polymer can be naturally hydrophobic or functionalized to be hydrophobic. Some polymers having a long hydrocarbon chain or silicon-oxygen backbone, for example, tend to be hydrophobic. Hydrophobic polymers include polystyrene, poly(d,l-lactide), poly(dimethylsiloxane), polypropylene, polyacrylic, polyethylene, etc. The mineral particle of interest or the valuable material associated with one or more hydrophobic molecules is referred to as a wetted mineral particle. When the pulp slurry contains a plurality of collectors or collector molecules, some of the mineral particles will become wetted mineral particles if the collectors are attached to mineral particles. Xanthates can be used in the pulp slurry as the collectors. The functionalized polymer coated member can be coated with hydrophobic silicone polymer including polysiloxanates so that the functionalized polymer coated member become hydrophobic. The functionalized polymer coated member can be made of hydrophobic polymers, such as polystyrene and polypropylene to provide the desired hydrophobicity.

Combined Collector/Hydrophobic Functionalized Polymer Coated Member

According to some embodiments of the present invention, only a part of the surface of the functionalized polymer coated member may be configured to have the molecules attached thereto, wherein the molecules comprise collectors.

According to some embodiments of the present invention, a part of the surface of the functionalized polymer coated member may be configured to have the molecules attached thereto, wherein the molecules comprise collectors, and another part of the surface of the functionalized polymer coated member may be configured to be hydrophobic.

According to some embodiments of the present invention, a part of the surface of the functionalized polymer coated member may be configured to be hydrophobic.

BRIEF DESCRIPTION OF THE DRAWING

Referring now to the drawing, which are not necessarily drawn to scale, the foregoing and other features and advantages of the present invention will be more fully understood from the following detailed description of illustrative embodiments, taken in conjunction with the accompanying drawing in which like elements are numbered alike:

FIG. 1 includes FIG. 1a is a side partial cutaway view in diagram form of a separation processor configured with two chambers, tanks or columns having a functionalized polymer coated impeller arranged therein according to some embodiments of the present invention, and includes FIG. 1b is a top partial cross-sectional view in diagram form of a functionalized polymer coated impeller moving in an attachment rich environment contained in an attachment chamber, tank or column and also moving in a release rich environment contained in a release chamber, tank or column according to some embodiments of the present invention.

DETAILED DESCRIPTION OF THE INVENTION

FIGS. 1, 1a, 1b

Figure 2:
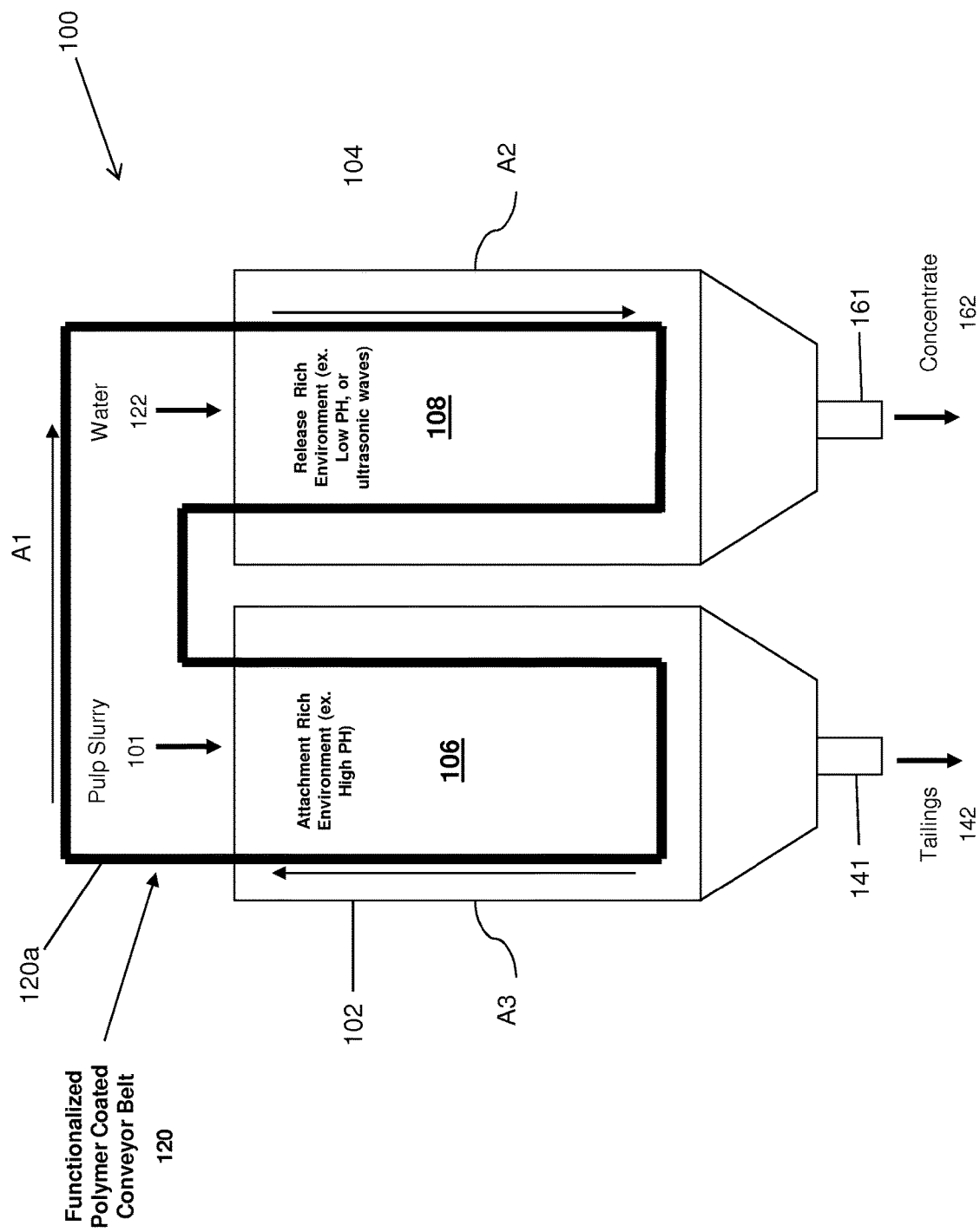
FIG. 2 is diagram of a separation processor configured with two chambers, tanks or columns having a functionalized polymer coated conveyor belt arranged therein according to some embodiments of the present invention.

By way of example, FIG. 1 shows the present invention is the form of a machine, device, system or apparatus 10, e.g., for separating valuable material from unwanted material in a mixture 11, such as a pulp slurry, using a first processor 12 and a second processor 14. The first processor 12 and the second processor 14 are configured with a functionalized polymer coated member that is shown, e.g., as a functionalized polymer coated impeller 20 (FIG. 1a), 20' (FIG. 1b), according to some embodiments of the present invention. In operation, the impeller 20, 20' slowly rotates in relation to the first processor 12 and the second processor 14, the impeller blades slowly pass through the attachment rich environment 16 in the first processor 12 where the valuable material is attached to the blades and through the release rich environment 18 in the second processor 14 is released from the blades. By way of example, the impeller 20 is shown rotating in a counterclockwise direction as indicated by arrow a, although the scope of the invention is not intended to be limited to the direction of the impeller rotation, or the manner in which the functionalized polymer coated impeller 20 (FIG. 1a), 20' (FIG. 1b) is arranged, mounted, or configured in relation to the first processor 12 and the second processor 14.

The first processor 12 may take the form of a first chamber, tank, cell or column that contains an attachment rich environment generally indicated as 16. The first chamber, tank or column 12 may be configured to receive via piping 13 the mixture or pulp slurry 11 in the form of fluid (e.g., water), the valuable material and the unwanted material in the attachment rich environment 16, e.g., which has a high pH, conducive to attachment of the valuable material. The second processor 14 may take the form of a second chamber, tank, cell or column that contains a release rich environment generally indicated as 18. The second chamber, tank, cell or column 14 may be configured to receive via piping 15, e.g., water 22 in the release rich environment 18, e.g., which may have a low pH or receive ultrasonic waves conducive to release of the valuable material. Attachment rich environments like that forming part of element environment 16 conducive to the attachment of a valuable material of interest and release rich environments like that forming part of environment 18 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 16 and a corresponding release rich environment like environment 18 based on the separation technology disclosed herein for any particular valuable mineral of interest, e.g., copper, forming part of any particular mixture or slurry pulp.

Although the invention is described as having a high pH in an attachment environment and a low pH in a release environment, embodiments are envisioned in which the invention will work equally as well where the pH of the attachment environment is selected to optimize the attachment of desired materials, such as a low, high or neutral pH, and the pH of the release environment is selected to be a different pH than the attachment environment and selected to optimize the release of the desired material.

In operation, the first processor 12 may be configured to receive the mixture or pulp slurry 11 of water, valuable material and unwanted material and the functionalized polymer coated member that is configured to attach to the valuable material in the attachment rich environment 16. In FIG. 1, the functionalized polymer coated member is shown as the functionalized polymer coated impeller 20 (FIG. 1a), 20' (FIG. 1b). In FIG. 1a, the functionalized polymer coated impeller 20 has a shaft 21 and at least one impeller blade 20a, 20b, 20c, 20d, 2e, 20f, 20g and is configured to rotate slowly inside the first processor 12 and the second processor 14. In FIG. 1b, the functionalized polymer coated impeller 20' has a shaft 21' and impeller blades 20a, 20b', 20c', 20d', 2e', 20f', 20g' and 20h'. Each impeller blade in FIG. 1 is understood to be configured and functionalized with a polymer coating to attach to the valuable material in the attachment rich environment 16. (The scope of the invention is not intended to be limited to the number of blades on the impeller 20, 20' and the embodiment in FIGS. 1a and 1b is shown with impellers 21, 21' having a different number of blades.)

In FIG. 1, the first processor 12 is configured to receive at least one impeller blade of the functionalized polymer coated impeller 20 (FIG. 1a), 20' (FIG. 1b). In FIG. 1b, the at least one impeller blade is shown as impeller blade 20g' being received in an attachment zone 30 that forms part of the attachment rich environment 16 defined by walls 30a, 30b. The first processor 12 may also be configured with a first transition zone generally indicated as 40 to provide drainage from piping 41 of, e.g., tailings 42 as shown in FIG. 1a.

The first processor 12 may also be configured to provide at least one enriched impeller blade having the valuable material attached thereto, after passing through the attachment rich environment 16. In FIG. 1b, the at least one enriched impeller blade is shown as the at least one enriched impeller blade 20c' being provisioned from the attachment rich environment 16 in the first processor 12 to the release rich environment 18 in the second processor 14.

The second processor 14 may be configured to receive via the piping 15 the fluid 22 (e.g. water) and the enriched functionalized polymer coated member to release the valuable material in the release rich environment 18. In FIG. 1b, the second processor 14 is shown receiving the enriched impeller blade 20c' in a release zone 50, e.g., that forms part of the release rich environment 18 and is defined, e.g., by walls 30c and 30d.

The second processor 14 may also be configured to provide the valuable material that is released from the enriched functionalized polymer coated member into the release rich environment 18. For example, in FIG. 1b the second processor 14 is shown configured with a second transition zone 60 defined by walls 30a and 30d to provide via piping 61 drainage of the valuable material in the form of a concentrate 62 (FIG. 1a).

FIG. 2: The Functionalized Polymer Coated Conveyor Belt

By way of example, FIG. 2 shows the present invention is the form of a machine, device, system or apparatus 100, e.g., for separating valuable material from unwanted material in a mixture 101, such as a pulp slurry, using a first processor 102 and a second processor 104. The first processor 102 and the second processor 104 are configured with a functionalized polymer coated member that is shown, e.g., as a functionalized polymer coated conveyor belt 120 that runs between the first processor 102 and the second processor 104, according to some embodiments of the present invention. The arrows A1, A2, A3 indicate the movement of the functionalized polymer coated conveyor belt 120. Techniques, including motors, gearing, etc., for running a conveyor belt like element 120 between two processors like elements 102 and 104 are known in the art, and the scope of the invention is not intended to be limited to any particular type or kind thereof either now know or later developed in the future. According to some embodiments of the present invention, the functionalized polymer coated conveyor belt 120 may be made of a mesh material.

The first processor 102 may take the form of a first chamber, tank, cell or column that contains an attachment rich environment generally indicated as 106. The first chamber, tank or column 102 may be configured to receive the mixture or pulp slurry 101 in the form of fluid (e.g., water), the valuable material and the unwanted material in the attachment rich environment 106, e.g., which has a high pH, conducive to attachment of the valuable material. The second processor 104 may take the form of a second chamber, tank, cell or column that contains a release rich environment generally indicated as 108. The second chamber, tank, cell or column 104 may be configured to receive, e.g., water 122 in the release rich environment 108, e.g., which may have a low pH or receive ultrasonic waves conducive to release of the valuable material. Consistent with that stated above, attachment rich environments like that forming part of element environment 106 conducive to the attachment of a valuable material of interest and release rich environments like that forming part of environment 108 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 106 and a corresponding release rich environment like environment 108 based on the separation technology disclosed herein for any particular valuable mineral of interest, e.g., copper, forming part of any particular mixture or slurry pulp.

In operation, the first processor 102 may be configured to receive the mixture or pulp slurry 101 of water, valuable material and unwanted material and the functionalized polymer coated conveyor belt 120 that is configured to attach to the valuable material in the attachment rich environment 106. In FIG. 2, the belt 120 is understood to be configured and functionalized with a polymer coating to attach to the valuable material in the attachment rich environment 106.

The first processor 102 may also be configured to provide drainage from piping 141 of, e.g., tailings 142 as shown in FIG. 2.

The first processor 102 may also be configured to provide an enriched functionalized polymer coated conveyor belt having the valuable material attached thereto, after passing through the attachment rich environment 106. In FIG. 2, the enriched functionalized polymer coated conveyor belt is shown, e.g., as that portion or part 120a of the belt 120 being provisioned from the attachment rich environment 106 in the first processor 102 to the release rich environment 108 in the second processor 104. It is understood that some other portions or parts of the belt 120 may be enriched, including the portion or part immediately leaving the attachment rich environment 106, as well as the portion or part immediately entering the release rich environment 108.

The second processor 14 may be configured to receive the fluid 122 (e.g. water) and the portion 120a of the enriched functionalized polymer coated conveyor belt 120 to release the valuable material in the release rich environment 108.

The second processor 104 may also be configured to provide the valuable material that is released from the enriched functionalized polymer coated member into the release rich environment 108. For example, in FIG. 2 the second processor 104 is shown configured to provide via piping 161 drainage of the valuable material in the form of a concentrate 162.

In FIG. 2, the first processor 102 is configured with the functionalized polymer coated conveyor belt 120 passing through with only two turns inside the attachment rich environment 106. However, embodiments are envisioned in which the first processor 102 may be configured to process the functionalized polymer coated conveyor belt 120 using a serpentine technique for winding or turning the belt 120 one way and another way, back and forth, inside the first processor to maximize surface area of the belt inside the processor 102 and exposure of the belt 120 to the attachment rich environment 106.

Figure 3:
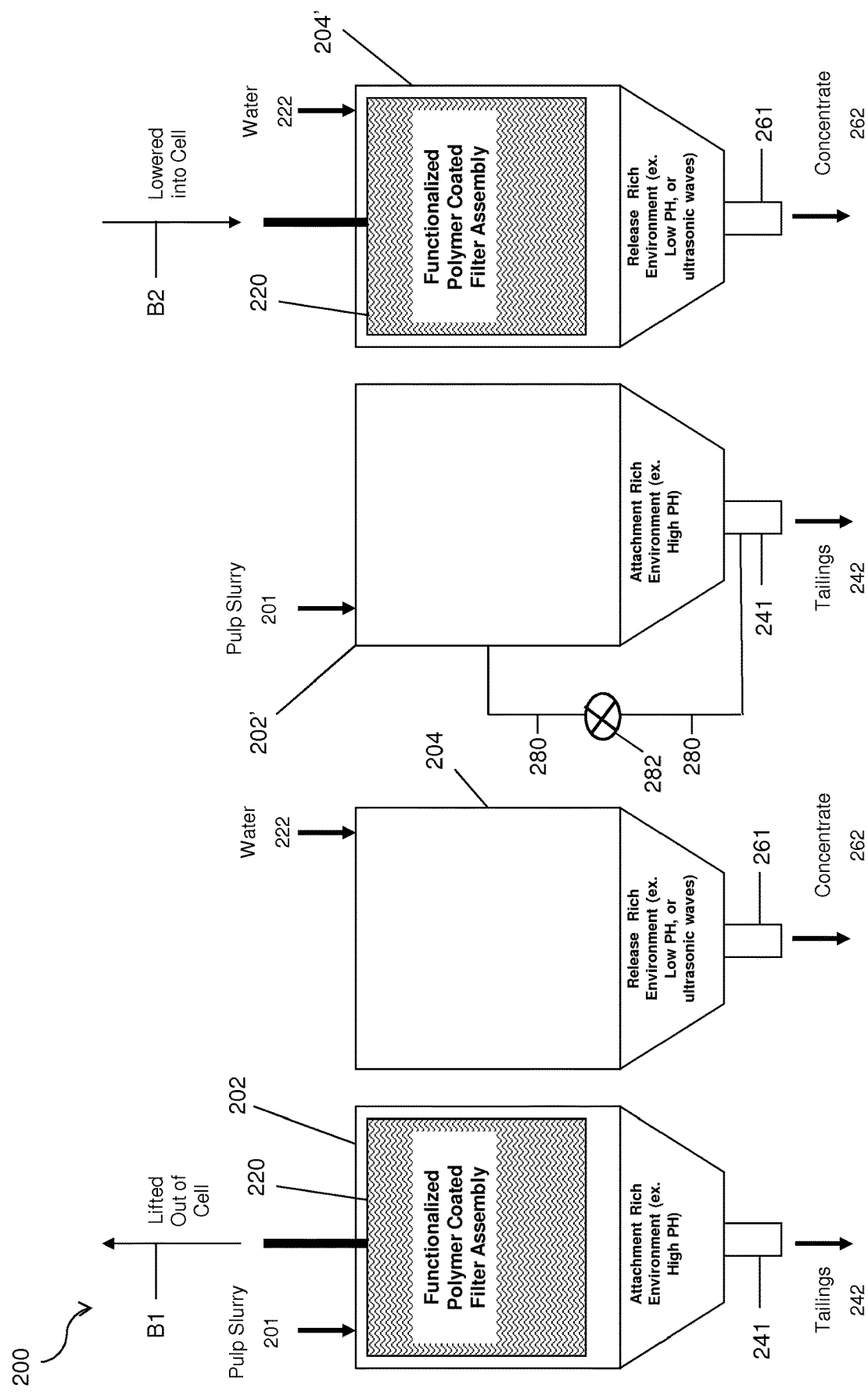
FIG. 3 is diagram of a separation processor configured with a functionalized polymer coated filter assembly for moving between two chambers, tanks or columns in a semi-continuous batch process according to some embodiments of the present invention.

FIG. 3: The Functionalized Polymer Coated Filter

By way of example, FIG. 3 shows the present invention is the form of a machine, device, system or apparatus 200, e.g., for separating valuable material from unwanted material in a mixture 201, such as a pulp slurry, using a first processor 202, 202' and a second processor 204, 204'. The first processor 202 and the second processor 204 are configured to process a functionalized polymer coated member that is shown, e.g., as a functionalized polymer coated collection filter 220 configured to be moved between the first processor 202 and the second processor 204' as shown in FIG. 3 as part of a batch type process, according to some embodiments of the present invention. In FIG. 3, by way of example the batch type process is shown as having two first processor 202, 202' and second processor 204, 204, although the scope of the invention is not intended to be limited to the number of first or second processors. Moreover, embodiments are envisioned using a different number of first and second processor, different types or kinds of processors, as well as different types or kinds of processors both now known or later developed in the future. According to some embodiments of the present invention, the functionalized polymer coated collection filter 220 may take the form of a membrane or a thin soft pliable sheet or layer. The arrow B1 indicates the movement of the functionalized polymer coated filter 220 from the first processor 202, and the arrow B2 indicates the movement of the functionalized polymer coated collection filter 220 into the second processor 202. Techniques, including motors, gearing, etc., for moving a filter like element 220 from one processor to another processor like elements 202 and 204 are known in the art, and the scope of the invention is not intended to be limited to any particular type or kind thereof either now know or later developed in the future.

The first processor 202 may take the form of a first chamber, tank, cell or column that contains an attachment rich environment generally indicated as 206. The first chamber, tank or column 102 may be configured to receive the mixture or pulp slurry 201 in the form of fluid (e.g., water), the valuable material and the unwanted material in the attachment rich environment 206, e.g., which has a high pH, conducive to attachment of the valuable material. The second processor 204 may take the form of a second chamber, tank, cell or column that contains a release rich environment generally indicated as 208. The second chamber, tank, cell or column 204 may be configured to receive, e.g., water 222 in the release rich environment 208, e.g., which may have a low pH or receive ultrasonic waves conducive to release of the valuable material. Consistent with that stated above, attachment rich environments like that forming part of element environment 206 conducive to the attachment of a valuable material of interest and release rich environments like that forming part of environment 208 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 206 and a corresponding release rich environment like environment 208 based on the separation technology disclosed herein for any particular valuable mineral of interest, e.g., copper, forming part of any particular mixture or slurry pulp.

In operation, the first processor 202 may be configured to receive the mixture or pulp slurry 101 of water, valuable material and unwanted material and the functionalized polymer coated collection filter 220 that is configured to attach to the valuable material in the attachment rich environment 206. In FIG. 3, the functionalized polymer coated collection filter 220 is understood to be configured and functionalized with a polymer coating to attach to the valuable material in the attachment rich environment 106.

The first processor 202 may also be configured to provide drainage from piping 241 of, e.g., tailings 242 as shown in FIG. 3.

The first processor 202 may also be configured to provide an enriched functionalized polymer coated collection filter having the valuable material attached thereto, after soaking in the attachment rich environment 106. In FIG. 3, the enriched functionalized polymer coated collection filter 220 is shown, e.g., being provisioned from the attachment rich environment 206 in the first processor 202 to the release rich environment 208 in the second processor 204.

The second processor 204 may be configured to receive the fluid 222 (e.g. water) and the enriched functionalized polymer coated collection filter 220 to release the valuable material in the release rich environment 208.

The second processor 204 may also be configured to provide the valuable material that is released from the enriched functionalized polymer coated collection filter 220 into the release rich environment 208. For example, in FIG. 3 the second processor 204 is shown configured to provide via piping 261 drainage of the valuable material in the form of a concentrate 262.

The first processor 202' may also be configured with piping 280 and pumping 280 to recirculate the tailings 242 back into the first processor 202'. The scope of the invention is also intended to include the second processor 204' being configured with corresponding piping and pumping to recirculate the concentrate 262 back into the second processor 204'. Similar recirculation techniques may be implemented for the embodiments disclosed in relation to FIGS. 1-2 above.

The scope of the invention is not intended to be limited to the type or kind of batch process being implemented. For example, embodiments are envisioned in which the batch process may include the first and second processors 202, 204 being configured to process the enriched functionalized polymer coated collection filter 220 in relation to one type or kind of valuable material, and the first and second processors 202', 204' being configured to process the enriched functionalized polymer coated collection filter 220 in relation to either the same type or kind of valuable material, or a different type or kind of valuable material. Moreover, the scope of the invention is intended to include batch processes both now known and later developed in the future.

Figure 4B:
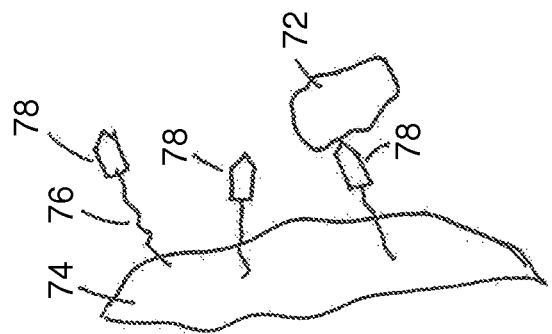
FIG. 4b illustrates an enlarged portion of the functionalized polymer coated member showing a molecule or molecular segment for attaching a function group to the surface of the functionalized polymer coated member, according to some embodiments of the present invention.
Figure 4A:
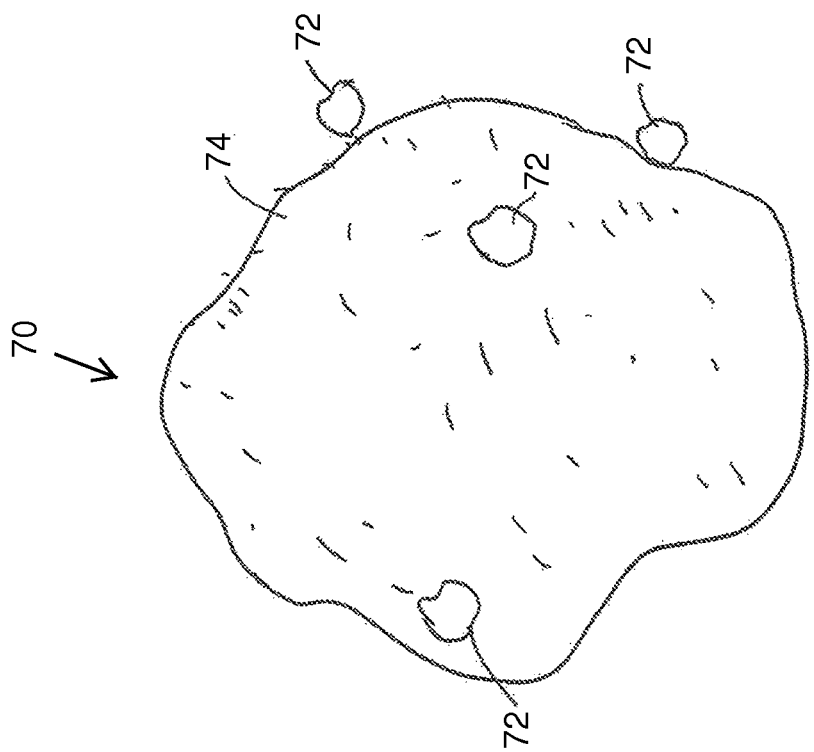
FIG. 4a shows at least part of a generalized a solid-phase body, e.g., a functionalized polymer coated member, according to some embodiments of the present invention.

FIGS. 4a, 4b: The Synthetic Bead Chemistry

For aiding a person of ordinary skill in the art in understanding various embodiments of the present invention, FIG. 4a shows at least part of a generalized solid-phase body, e.g., a functionalized polymer coated member, and FIG. 4b shows an enlarged portion of the surface. As shown in FIGS. 4a and 4b, the functionalized polymer coated member 70 has a body to provide a surface 74. At least the outside part of the body may be made of a synthetic material, such as polymer, so as to provide a plurality of molecules or molecular segments 76 on the surface 74. The molecule 76 is used to attach a chemical functional group 78 to the surface 74. In general, the molecule 76 can be a hydrocarbon chain, for example, and the functional group 78 can have an anionic bond for attracting or attaching a mineral particle of interest, such as copper to the surface 74. A xanthate, for example, has both the functional group 78 and the molecular segment 76 to be incorporated into the polymer that is used to make the synthetic bead 70, or the surface thereof. The functional group 78 is also known as a collector that can have a neutral or charged functional group for attachment to the desired mineral, e.g., via a non-ionizing or ionizing bond. The charged functional group may include an ionizing bond that is anionic or cationic. An anionic bond or groups may include an oxyhydryl, such as carboxylic, sulfates and sulfonates, and sulfhydral, such as xanthates and dithiophosphates. Other molecules or compounds that can be used to provide the function group 78 include thionocarboamates, thioureas, xanthogens, monothiophosphates, hydroquinones and polyamines.

Similarly, a chelating agent can be incorporated into the polymer as a collector site for attracting a mineral, such as copper. As shown in FIG. 4b, a mineral particle 72 is attached to the functional group 78 on the molecule 76. In general, the mineral particle 72 is much smaller than the synthetic bead 70. Many mineral particles 72 can be attracted to or attached to the surface 74 of a functionalized polymer coated member 70.

In some embodiments of the present invention, a functionalized polymer coated member may take the form of a solid-phase body made of a synthetic material, such as polymer. (By way of example, the term "solid-phase body" is understood herein to be a body having a cohesive force of matter that is strong enough to keep the molecules or atoms in the given positions, restraining the thermal mobility.) The polymer can be rigid or elastomeric. An elastomeric polymer can be a bisoxazolone-based polymer, for example. The body has a surface comprising a plurality of molecules with one or more functional groups for attracting mineral particles of interest to the surface. A polymer having a functional group to attract or collect mineral particles is referred to as a functionalized polymer. By way of example, the entire body of the functionalized polymer coated member may be made of the same functionalized material, or the body may be a shell, which can be formed around an inner material.

It should be understood that the surface of a functionalized polymer coated member, according to the present invention, is not limited to an overall smoothness of its surface as shown in FIG. 4a. In some embodiments of the present invention, the surface can be irregular and rough. For example, the surface can have some physical structures like grooves or rods, or holes or dents. The surface can have some hair-like physical structures. In addition to the functional groups on the functionalized polymer coated member that attract mineral particles of interest to the surface, the physical structures can help trapping the mineral particles on the surface. The surface can be configured to be a honeycomb surface or a sponge-like surface for trapping the mineral particles and/or increasing the contacting surface. In effect, the scope of the invention is not intended to be limited to any particular type or kind of surface of the synthetic bead.

It should be noted that the functionalized polymer coated member of the present invention can be realized by a different way to achieve the same goal. Namely, it is possible to use a different means to attract the mineral particles of interest to the surface of the functionalized polymer coated member. For example, the surface of the polymer coated member can be functionalized with a hydrophobic chemical molecule or compound, as discussed below. Alternatively, the surface of the functionalized polymer coated member can be coated with hydrophobic chemical molecules or compounds. In the pulp slurry, xanthate and hydroxamate collectors can also be added therein for collecting the mineral particles and making the mineral particles hydrophobic. When the functionalized polymer coated member are used to collect the mineral particles in the pulp slurry having a pH value around 8-9, it is possible to release the mineral particles on the enriched synthetic beads from the surface of the functionalized polymer coated member in an acidic solution, such as a sulfuric acid solution. According to some embodiment, it may also be possible to release the mineral particles carried with the enriched functionalized polymer coated member by sonic agitation, such as ultrasonic waves, or simply by washing it with water.

Figure 5B:
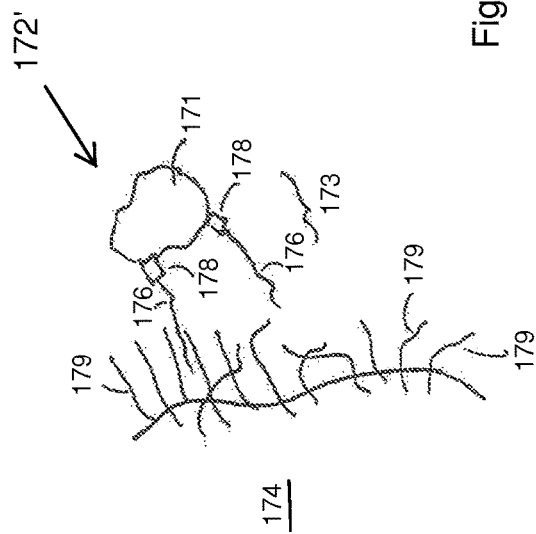
FIG. 5b illustrates an enlarged portion of the functionalized polymer coated member showing a wetted mineral particle attached to the hydrophobic surface of the functionalized polymer coated member, according to some embodiments of the present invention.
Figure 5C:
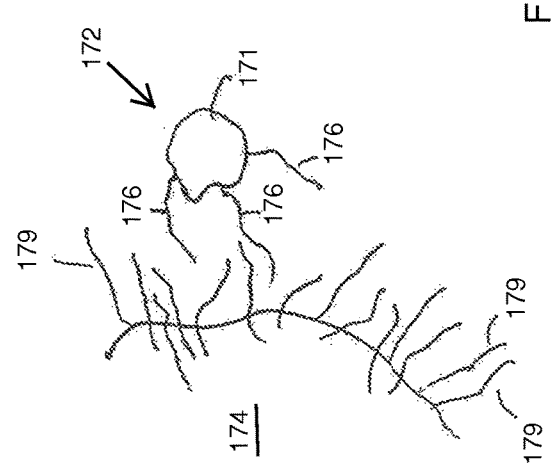
FIG. 5c illustrates an enlarged portion of the functionalized polymer coated member showing a hydrophobic particle attached to the hydrophobic surface of the functionalized polymer coated member, according to some embodiments of the present invention.
Figure 5A:
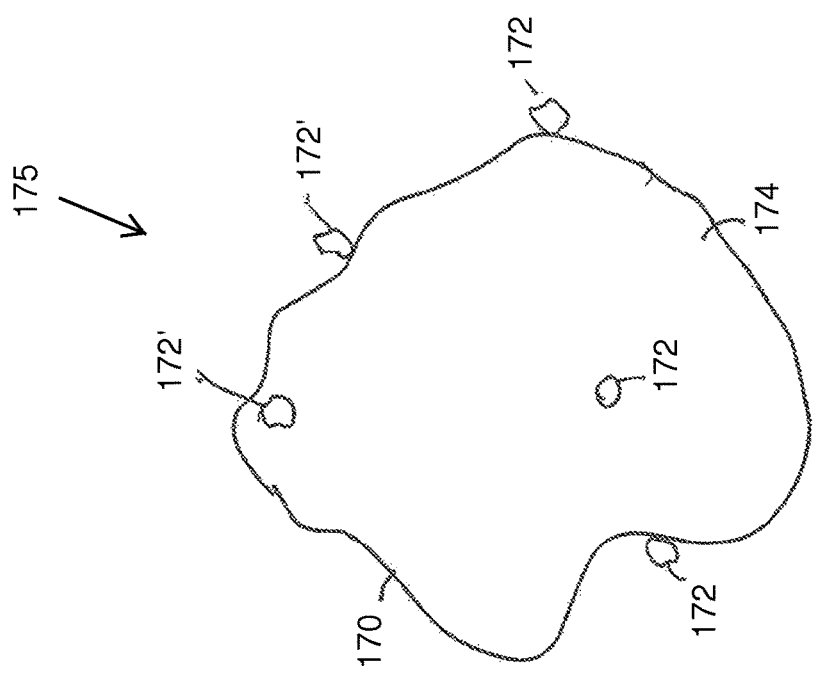
FIG. 5a shows at least part of a generalized a solid-phase body, e.g., functionalized polymer coated member, having some particles attached to the surface, according to some embodiments of the present invention.

FIGS. 5a to 5c: Hydrophobicity

For aiding a person of ordinary skill in the art in understanding various embodiments of the present invention, FIG. 5a shows at least part of a generalized functionalized polymer coated member having some particles attached to the surface. FIG. 5b illustrates an enlarged portion of the functionalized polymer coated member showing a wetted mineral particle attached to the hydrophobic surface of the functionalized polymer coated member. FIG. 5c illustrates an enlarged portion of the functionalized polymer coated member showing a hydrophobic particle attached to the hydrophobic surface of the functionalized polymer coated member.

The hydrophobic particle can be mineral related or non-mineral related.

As shown in FIG. 5a, the functionalized polymer coated member 170 may have a body to provide a surface 174. At least the outside part of the body is made of a synthetic material, such as a hydrophobic polymer, or a coating of a hydrophobic chemical. As such, hydrophobic particles 172, 172' are attracted to the surface 174 to form an enriched functionalized polymer coated member 175. As shown in FIGS. 5a and 5b, the surface 174 of the functionalized polymer coated member comprises a plurality of molecules 179 which renders the surface 174 hydrophobic. Polysiloxanates, such as hydroxyl-terminated polydimethysiloxanes, have a silicon-oxygen chain to provide the hydrophobic molecules 179. The hydrophobic particle 172', as shown in FIG. 5b, can be a mineral particle 171' having one or more collectors 173 attached thereto. One end 178 of the collector 173 has an ionic bond or ionic group attached to the mineral particle of interest 171'. The other end of the collector 173 has a hydrophobic chain 176 which tends to move into the hydrophobic molecules 179. Thus, the hydrophobic particle 172' can be a wetted mineral particle. A collector, such as xanthate, has both the functional group 178 and the molecule 176. A xanthate, for example, has both the functional group 178 and the molecular segment 176 to be incorporated into the polymer that is used to make the functionalized polymer coated member 170. A functional group 178 is also known as a collector that can have a non-ionizing or ionizing bond. The ionizing bond or group can be anionic or cationic. An anionic bond or group may include an oxyhydryl, such as carboxylic, sulfates and sulfonates, and sulfhydral, such as xanthates and dithiophosphates. Other molecules or compounds that can be used to provide the function group 178 include thionocarboamates, thioureas, xanthogens, monothiophosphates, hydroquinones and polyamines.

The hydrophobic particle 172, as shown in FIG. 5c, can be a particle that has a hydrophobic chain 176. Such particle can be non-mineral related, but it can be arranged to contact with the hydrophobic functionalized polymer coated member 170 of the present inventions. Thus the hydrophobic functionalized polymer coated member 170, according to some embodiments of the present invention, can be used in non-mining applications, such as water-pollution control and water purification.

pH

In many releasing environments, the pH value is lower than the pH value for mineral attachment. It should be noted that, however, when the valuable material is copper, for example, it is possible to provide a lower pH environment for the attachment of mineral particles and to provide a higher pH environment for the releasing of the mineral particles from the synthetic beads or bubbles. In general, the pH value is chosen to facilitate the strongest attachment, and a different pH value is chosen to facilitate release. Thus, according to some embodiments of the present invention, one pH value is chosen for mineral attachment, and a different pH value is chosen for mineral releasing. The different pH could be higher or lower, depending on the specific mineral and collector.

Bead Size (Range)

The synthetic beads, according to some embodiments of the present invention, can be made with different sizes in order to attract mineral particles of different sizes. For example, unlike air bubbles, the synthetic beads of a larger size can be used to attract mineral particles larger than, say, 200 µm. Thus, the grinding of the blasted ore can be separated into different stages. In the first stage, the rock is crushed into particles in the order of 200 µm. After the separation process using the larger synthetic beads in the slurry containing these crude particles, the remaining slurry can be subjected to a finer grinding stage where the crushed rock is further crushed into particles in the order of 100 µm. With the slurry containing the finer mineral particles, synthetic beads with a smaller size may be more effective in interacting with the finer mineral particles. In a flotation cell application, the bead size can be smaller than 100 µm. In a tailings pond application, the bead size can be 1 mm to 10 mm or larger. However, large beads would reduce the functionalized surfaces where the mineral particles can attach to the synthetic beads. Thus, according to some embodiments of the present invention, the synthetic beads are configured with a size less than 100 µm for attracting to mineral particles having a substantially similar size, including in applications related to flotation cells; the synthetic beads are configured with a size of about 100 µm for attracting or attaching to mineral particles having a substantially similar size, smaller size or larger size; the synthetic beads are configured with a size in a range of about 50-500 µm for attracting or attaching to mineral particles having a substantially similar size, smaller size or larger size; the synthetic beads are configured with a size about 200 µm for attracting to mineral particles having a substantially similar size; the synthetic beads are configured with a size in a range of about 1 mm to 10 mm, including in applications related to a tailings pond. In general, the synthetic beads are configured with a size in a range of about 50 µm to 10 mm. But the beads can be smaller than 50 µm and larger than 10 mm.

Relative Size

According to some embodiments of the present invention, the synthetic beads are configured to be larger than the mineral particles. As such, a plurality of mineral particles may attach to one synthetic bead. According to other embodiments of the present invention, the synthetic beads are configured to be smaller than the mineral particles. As such, a plurality of synthetic beads may attach to one mineral particle. The size of the synthetic beads can also be about the same as the size of the mineral particle.

Oilsands Separation

It should be understood that the synthetic beads according to the present invention, whether functionalized to have a collector or functionalized to be hydrophobic, are also configured for use in oilsands separation—to separate bitumen from sand and water in the recovery of bitumen in an oilsands mining operation. Likewise, the functionalized filters and membranes, according to some embodiments of the present invention, are also configured for oilsands separation.

Portion of Surface Functionalized

According to some embodiments of the present invention, only a portion of the surface of the synthetic bead is functionalized to be hydrophobic. This has the benefits as follows:

1. Keeps too many beads from clumping together—or limits the clumping of beads,
2. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

According to some embodiments of the present invention, only a portion of the surface of the synthetic bead is functionalized with collectors. This also has the benefits of 1. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

Both Collector and Hydrophobic on Same Bead

Figure 6A:
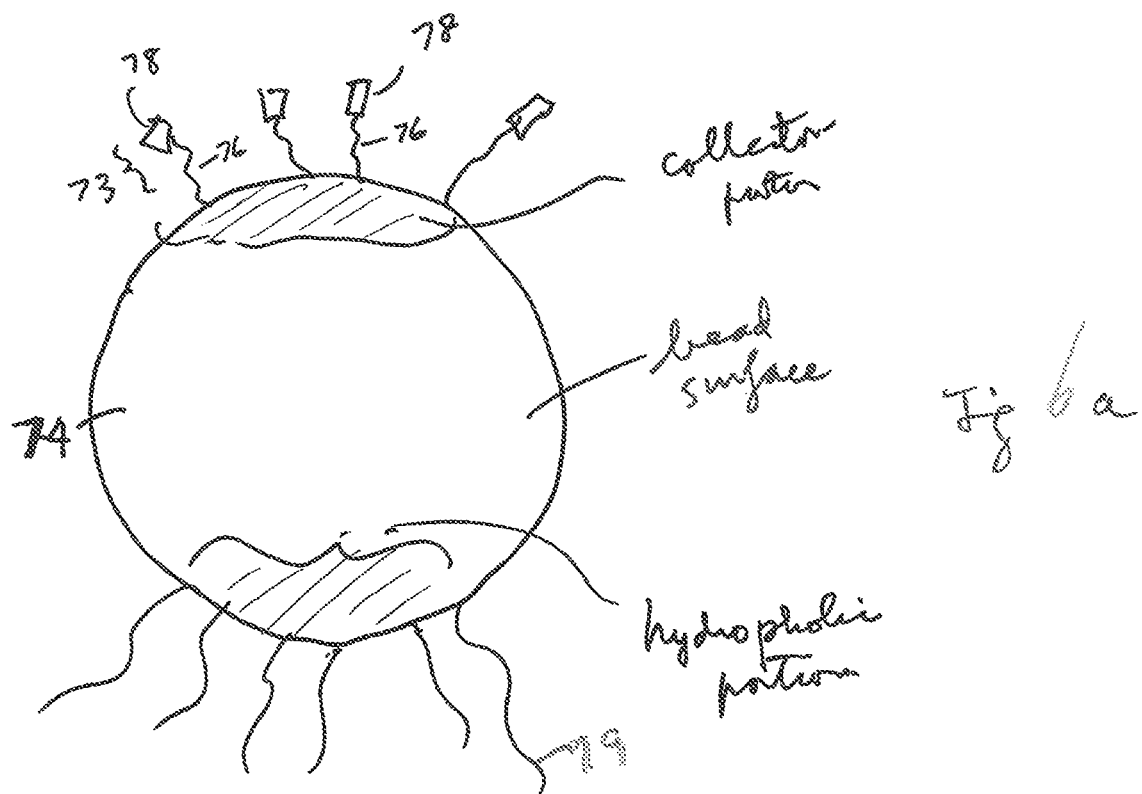
FIGS. 6a and 6b illustrate some embodiments of the present invention wherein the synthetic bead or bubble have one portion functionalized to have collector molecules and another portion functionalized to be hydrophobic, according to some embodiments of the present invention.
Figure 6B:
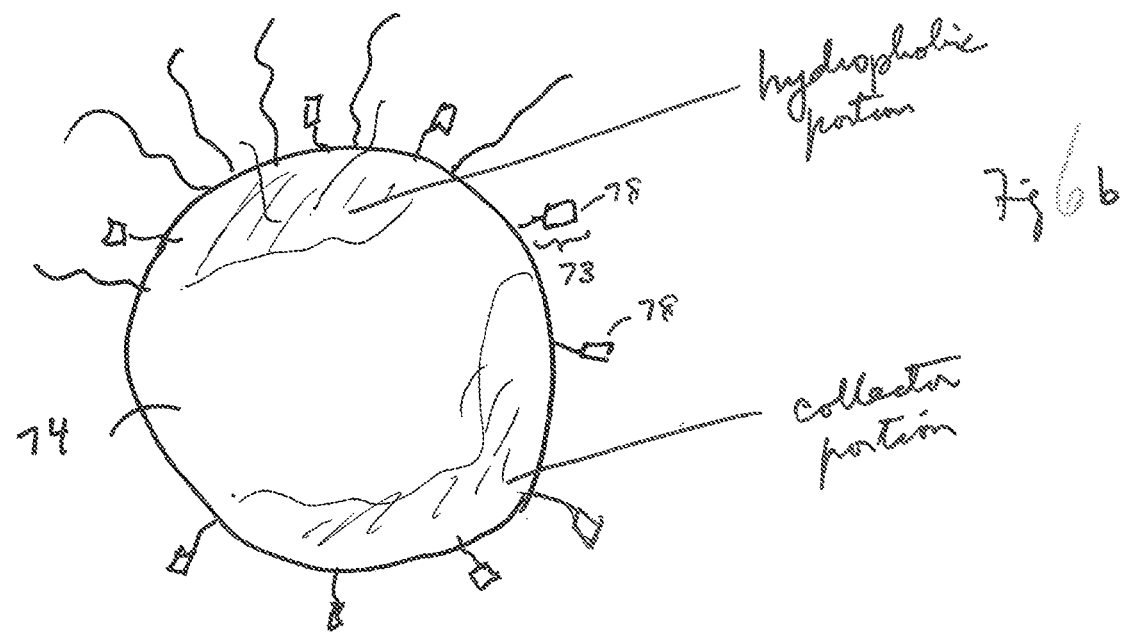

According to some embodiments of the present invention, one part of the synthetic bead is functionalized with collectors while another part of same synthetic bead is functionalized to be hydrophobic as shown in FIGS. 6a and 6b. As shown in FIG. 6a, a synthetic bead 74 has a surface portion where polymer is functionalized to have collector molecules 73 with functional group 78 and molecular segment 76 attached to the surface of the bead 74. The synthetic bead 74 also has a different surface portion where polymer is functionalized to have hydrophobic molecules 179 (or 79). In the embodiment as shown in FIG. 6b, the entire surface of the synthetic bead 74 can be functionalized to have collector molecules 73, but a portion of the surface is functionalized to have hydrophobic molecules 179 (or 79) render it hydrophobic.

Advantages of Same Bead Having Both Collector Molecules and Hydrophobic Molecules According to some embodiments of the present invention, one part of the synthetic bead is functionalized with collectors while another part of same synthetic bead is functionalized to be hydrophobic and this "hybrid" synthetic bead is configured for use in a traditional flotation cell as well. The "hybrid" synthetic bead (see FIGS. 6a and 6b) has a hydrophobic portion and a separate collector portion. When the "hybrid" beads are mixed with air in the flotation cell, some of them will attach to the air bubbles because of the hydrophobic portion. As the "hybrid" synthetic bead is attached to an air bubble, the collector portion of the attached bead can collect mineral particles with the functional groups. Thus, the synthetic beads, according to some embodiments of the present inventions, can be used to replace the air bubbles, or to work together with the air bubbles in a flotation process.

A Collector

According to some embodiments of the present invention, the surface of a synthetic bead can be functionalized to have a collector molecule. The collector has a functional group with an ion capable of forming a chemical bond with a mineral particle. A mineral particle associated with one or more collector molecules is referred to as a wetted mineral particle. According to some embodiments of the present invention, the synthetic bead can be functionalized to be hydrophobic in order to collect one or more wetted mineral particles.

Applications

The scope of the invention is described in relation to mineral separation, including the separation of copper from ore.

By way of example, applications are envisioned to include

Rougher, scavenger, cleaner and rougher/scavenger separation cells in the production stream, replacing the traditional flotation machines.

Tailings scavenger cells used to scavenge the unrecovered minerals from a tailings stream.

Tailings cleaning cell use to clean unwanted material from the tailings stream before it is sent to the disposal pond.

Tailings reclamation machine that is placed in the tailings pond to recover valuable mineral that has been sent to the tailings pond.

Other types or kinds of valuable material or minerals of interest, including gold, molybdenum, etc.

However, the scope of the invention is intended to include other types or kinds of applications either now known or later developed in the future, including applications related to oilsands separation that includes separating bitumen from sand and water in the recovery of bitumen in an oilsands milling operation.

The Scope of the Invention

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow). Although the invention has been described and illustrated with respect to exemplary embodiments thereof, the foregoing and various other additions and omissions may be made therein and thereto without departing from the spirit and scope of the present invention.

What is claimed is:

1. An apparatus comprising:
a first processor comprising:
a functionalized polymer coated member;
an input to receive a mixture containing fluid and mineral particles; and
an attachment zone arranged for placement of the functionalized polymer coated member, the functionalized polymer coated member having molecules to attach to the mineral particles in the mixture to provide an enriched functionalized polymer coated member having the mineral particles attached thereto; and
a second processor comprising:
a release zone in communication with the first processor to receive the enriched functionalized polymer coated member and to release the mineral particles from the enriched functionalized polymer coated member, wherein the functionalized polymer coated member comprises a surface coated with a hydrophobic silicone polymer to provide the molecules.

2. An apparatus according to claim 1, wherein the first processor comprises a first chamber, tank or column, and the second processor comprises a second chamber, tank or column.

3. An apparatus according to claim 2, wherein the mixture comprises a pulp slurry having water and the mineral particles, and wherein the first chamber, tank or column comprises the input to receive the pulp slurry, wherein the attachment zone has a pH value higher than 7, conducive to attachment of the mineral particles to the functionalized polymer coated member.

4. An apparatus according to claim 2, wherein the second chamber, tank or column comprises an inlet to receive water into the release zone, which has a pH value lower than 7 or receives ultrasonic waves conducive to release of the mineral particles from the enriched functionalized polymer coated member.

5. An apparatus according to claim 1, wherein the functionalized polymer coated member comprises a functionalized polymer coated impeller having at least one impeller blade rotatable inside the first processor and the second processor.

6. An apparatus according to claim 5, wherein
the first processor comprises the at least one impeller blade in the attachment zone, so as to provide at least one enriched impeller blade having the mineral particles attached thereto to the release zone in
the second processor so as to release the mineral particles from the at least one enriched impeller blade.

7. An apparatus according to claim 5, wherein the first processor comprises a first transition zone between the attachment zone and the second processor to provide drainage of tailings.

8. An apparatus according to claim 2, wherein the functionalized polymer coated member comprises a functionalized polymer coated conveyor belt movable between the first processor and the second processor.

9. An apparatus according to claim 8, wherein
the first processor comprises the functionalized polymer coated conveyor belt in the attachment zone to provide an enriched functionalized polymer coated conveyor belt having the mineral particles attached thereto to the release zone in
the second processor so as to release the mineral particles from the enriched functionalized polymer coated conveyor belt and to provide the mineral particles released from the enriched functionalized polymer coated conveyor belt.

10. An apparatus according to claim 8, wherein the functionalized polymer coated conveyor belt is made of a mesh material.

11. An apparatus according to claim 1, wherein the functionalized polymer coated member comprises a functionalized polymer coated collection filter transferable between the first processor and the second processor as part of a batch type process.

12. An apparatus according to claim 11, wherein
the first processor comprises the functionalized polymer coated collection filter in the attachment zone to provide an enriched functionalized polymer coated collection filter having the mineral particles attached thereto to the release zone in
the second processor so as to release the mineral particles from the enriched functionalized polymer coated collection filter and to provide the mineral particles released from the enriched functionalized polymer coated collection filter.

13. An apparatus according to claim 1, wherein the functionalized polymer coated member comprises a membrane or a thin soft pliable sheet or layer.

14. A method comprising:
receiving in a first processor a mixture containing fluid and mineral particles, the first processor comprising a functionalized polymer coated member and an attachment zone arranged for placement of the functionalized polymer coated member, the functionalized polymer coated member having molecules to attach to the mineral particles in the mixture;
providing from the first processor an enriched functionalized polymer coated member having the mineral particles attached thereto to a release zone in a second processor; and
releasing the mineral particles from the enriched functionalized polymer coated member in the release zone, wherein the functionalized polymer coated member comprises a surface coated with a hydrophobic silicone polymer to provide the molecules.

15. A method according to claim 14, wherein the first processor comprises a first chamber, tank or column, and the second processor comprises a second chamber, tank or column.

16. A method according to claim 15, wherein the mixture comprises a pulp slurry having water and the mineral particles, wherein the first chamber, tank or column comprises the pulp slurry in the attachment zone, which has a pH value higher than 7, conducive to attachment of the mineral particles.

17. A method according to claim 15, wherein the second chamber, tank or column comprises an inlet to receive water into the release zone, which has a pH value lower than 7 or receives ultrasonic waves conducive to release of the mineral particles from the enriched functionalized polymer coated member.

18. A method according to claim 14, wherein the functionalized polymer coated member comprises a functionalized polymer coated impeller having at least one impeller blade rotatable inside the first processor and the second processor.

19. A method according to claim 18, wherein
the first processor comprises the at least one impeller blade in the attachment zone, and provides at least one enriched impeller blade having the mineral particles attached thereto to the release zone in the second processor so as to release the mineral particles from the at least one enriched impeller blade and to provide the mineral particles released from the at least one enriched impeller blade.

20. A method according to claim 18, wherein the first processor comprises a first transition zone between the attachment zone and the second processor to provide drainage of tailings, and the second processor comprises an outlet to provide drainage of concentrate.

21. A method according to claim 15, wherein the functionalized polymer coated member comprises a functionalized polymer coated conveyor belt movable between the first processor and the second processor.

22. A method according to claim 21, wherein
the first processor comprises the functionalized polymer coated conveyor belt in the attachment zone to provide an enriched functionalized polymer coated conveyor belt having the mineral particles attached thereto to the release zone in
the second processor so as to release the mineral particles from the enriched functionalized polymer coated conveyor belt and provide the mineral particles released from the enriched functionalized polymer coated conveyor belt.

23. A method according to claim 21, wherein the functionalized polymer coated conveyor belt is made of a mesh material.

24. A method according to claim 14, wherein the functionalized polymer coated member comprises a functionalized polymer coated collection filter transferable between the first processor and the second processor as part of a batch type process.

25. A method according to claim 24, wherein
the first processor comprises the functionalized polymer coated collection filter in the attachment zone to provide an enriched functionalized polymer coated collection filter having the mineral particles attached thereto to the release zone in the second processor so as to release the mineral particles from the enriched functionalized polymer coated collection filter and provide the mineral particles released from the enriched functionalized polymer coated collection filter.

26. A method according to claim 14, wherein the first processor comprises a first outlet to provide tailings, and the second processor comprises a second outlet to provide a concentrate containing the mineral particles.

27. A method according to claim 14, wherein the functionalized polymer coated member comprises a membrane or a thin soft pliable sheet or layer.

28. An apparatus comprising:
first processing means having a functionalized polymer coated member, an attachment zone, and a first inlet to receive a mixture containing fluid and mineral particles into the attachment zone, the attachment zone arranged for placement of the functionalized polymer coated member, the functionalized polymer coated member comprising a surface coated with a hydrophobic silicone polymer having molecules to attach to the mineral particles in the mixture, the first processing means further arranged to provide an enriched functionalized polymer coated member having the mineral particles attached thereto; and
second processing means in communication with the first processing means, the second processing means having a second inlet to receive water and the enriched functionalized polymer coated member in a release zone to release the mineral particles from the enriched functionalized polymer coated member, the second processing means further arranged to provide the mineral particles released from the enriched functionalized polymer coated member.

29. An apparatus according to claim 28, wherein the mixture comprises a pulp slurry having water and the mineral particles; and the first processing means has an input to receive the pulp slurry in the attachment zone, which has a pH value higher than 7, conducive to attachment of the mineral particles to the functionalized polymer coated member; and the second processing means comprises an inlet to receive water into the release zone, which has a pH value lower than 7 or receives ultrasonic waves conducive to release of the mineral particles from the enriched functionalized polymer coated member.

30. An apparatus according to claim 28, wherein the functionalized polymer coated member comprises one of the following:
a functionalized polymer coated impeller having at least one impeller blade rotatable inside the first processing means and the second processing means;

a functionalized polymer coated conveyor belt movable between the first processing means and the second processing means; or a functionalized polymer coated collection filter transferable between the first processing means and the second processing means as part of a batch type process.

31. An apparatus according to claim 1, wherein the surface is made from a synthetic material selected from a group consisting of polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), and phenolic resin.

32. An apparatus according to claim 1, wherein the functionalized polymer coated member comprises a solid-phase body having the surface, at least one part of the surface configured to be hydrophobic.

33. An apparatus according to claim 1, wherein the hydrophobic silicone polymer is selected from the group consisting of polysiloxanates, hydroxyl-terminated polydimethylsiloxanes, and polydimethylsiloxane.

34. An apparatus according to claim 32, wherein another part of the surface comprises collectors.

35. An apparatus according to claim 34, wherein the collectors are selected from the group consisting of oxyhydryl, sulfates, sulfonates, sulfhydral, dithiophosphates, thionocarboamates, thioureas, xanthogens, monothiophosphates, hydroquinones, and polyamines.

36. An apparatus according to claim 1, wherein the functionalized polymer coated member comprises a solid-phase body having the surface, the surface comprising physical structures such as grooves, rods, holes or dents configured to trap the mineral particles.

* * * * *